(12) United States Patent
Brill, III et al.

(10) Patent No.: US 6,437,808 B1
(45) Date of Patent: Aug. 20, 2002

(54) APPARATUS AND METHOD FOR TRANSMITTING GRAPHICAL REPRESENTATIONS

(75) Inventors: Frank Z. Brill, III, Plano, TX (US); Scott A. King, Columbus, OH (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/492,582

(22) Filed: Jan. 27, 2000

Related U.S. Application Data (60) Provisional application No. 60/118,299, filed on Feb. 2, 1999.

(51) Int. Cl.[7] .............................................. G06T 15/70
(52) U.S. Cl. ...................................... 345/765; 345/425
(58) Field of Search ................................ 345/762, 765, 345/848, 764, 418, 419, 473, 475, 425

(56) References Cited

U.S. PATENT DOCUMENTS

| | | | |
|---|---|---|---|
| 6,016,148 A | * | 1/2000 | Kang et al. .................. 345/425 |
| 6,163,322 A | * | 12/2000 | LaChapelle .................. 345/473 |
| 6,283,858 B1 | * | 9/2001 | Hayes, Jr. et al. ............ 463/31 |

* cited by examiner

Primary Examiner—Cao H. Nguyen
(74) Attorney, Agent, or Firm—Robert L. Troike; Frederick J. Telecky, Jr.

(57) ABSTRACT

An apparatus and method for transmitting graphical representations is disclosed. The present invention has an image generator (112) that generates an image (114) of a head (106) with facial features, including an eye portion (202) that correlates to an eye (240) in the head (106). The apparatus also has a non-updating tracker (116) that searches for an eye target image of the eye (240) in the head (106). The eye portion (202) correlating to the eye (240) is positioned at the target image located by the non-updating tracker (116). The apparatus also has an updating tracker (118) that searches for an updated eye target image when the non-updating tracker (116) is unable to locate the eye target image. The updating tracker (118) also positions the eye portion (202) at the updated eye target image and updates the updated eye target image with the eye portion (202). The updating tracker further determines the location of the eye portion (202). The apparatus also has an image differentiator (120) coupled to the trackers for providing image differential signals (124), including eye differential signals representing positional difference from the location of the eye portion (202). The apparatus also has a display device (130) that receives the image differential signals (124), including the eye differential signals, and animates a model (136) with the received image differential signals (134).

19 Claims, 6 Drawing Sheets

APPARATUS AND METHOD FOR TRANSMITTING GRAPHICAL REPRESENTATIONS

This application claims priority under 35 USC § 119(e)(1) of provisional application No. 60/118,299, filed Feb. 02, 1999.

TECHNICAL FIELD OF THE INVENTION

The present invention relates in general to video display devices, and, more particularly, to an apparatus and method for transmitting graphical representations, such as an image of a head.

BACKGROUND OF THE INVENTION

Humans communicate using several signals, for example, voice, facial expressions, and, to a lesser extent, hands and body movement. When face to face, these signals are processed accordingly to convey communication. On a non-visual communications device, such as a phone, these signals are not processed. Video devices may transmit the signals, but require high bandwidth. Thus, devices with low bandwidth, such as cell phones, are not able to transmit these signals.

One method to achieve low-bit rate communication is model-based visual communications, as described by K. Aizawa and T. S. Huang, *Model-Based Image Coding: Advanced Video Coding Techniques for Very Low Bit-Rate Applications,* Proceedings of IEEE, 82(2), 259–271 (February 1995). Model-based visual communications takes an object of interest, and uses it at both ends of communication so that only model parameters are transmitted. By using a model of a human head, only parameters that describe the static and dynamic state of the head are transmitted with each frame instead of full video. This method, however, results in a unconvincing representation of the head at the receiving display.

Human communication is multi-modal. Emotion and meaning are transmitted via facial expressions, using the eyebrows, eyes, and the mouth, as described by Paul Ekman and Wallace Friesen, *Unmasking the Face,* Prentice Hall, Inc., Englewood Cliffs, N.J., 1975. Eyebrow movements give rise to forehead wrinkles, eye movements give rise to wrinkles and cheek movements, and mouth movements affect the jaw line and cheeks. In order to convey facial expressions convincingly, the synthesized face must contain motion that is similar to the original. This operation requires a system to track the eyebrows, eyes, and mouth. Previous attempts have involved systems that require a high bandwidth to transmit these signals. Existing systems utilize optical flow with a high computational cost, as described by Malcolm Davis and Mihran Tuceryan, *Coding of Facial Image Sequences by Model-Based Optical Flow,* Proceedings of the 1997 Int'l Workshop on Synthetic-Natural Hybrid Coding and 3D Imaging, at 192–194 (September 1997), and Douglas DeCarlo and Dimitris Metaxas, *The Integration of Optical Flow and Deformable Models with Applications to Human Face Shape and Motion Estimation,* Proceedings CUPR 96, at 231–2138 (1996).

From the foregoing, it may be appreciated that a need has arisen for a method for extracting, transmitting, and displaying a graphical representation with reduced band-width requirements and increased optical flow.

SUMMARY OF THE INVENTION

In accordance with an embodiment, a method for transmitting and displaying graphical representations comprises capturing an image of a head with an eye portion that correlates to an eye in the head, locating a target image of the eye within the image with a non-updating tracker, positioning the eye portion at the location of the target image of the eye, and, if the non-updating tracker is unable to locate the eye target image, then locating an updated eye target image with an updating tracker positioning the eye portion at the location of the updated eye target image, and updating the location of the eye portion.

BRIEF DESCRIPTION OF THE DRAWING

For a more complete understanding of the present invention and the advantages thereof, reference is now made to the following descriptions taken in connection with the accompanying drawing, in which.

DETAILED DESCRIPTION OF THE INVENTION

Embodiments of the present invention and its advantages are best understood by referring now in more detail to FIGS. 1–8 of the drawing, in which like numerals refer to like parts. FIGS. 1–8 illustrate an apparatus and method for transmitting a graphical representation in accordance with one embodiment of the present invention.

Figure 1:
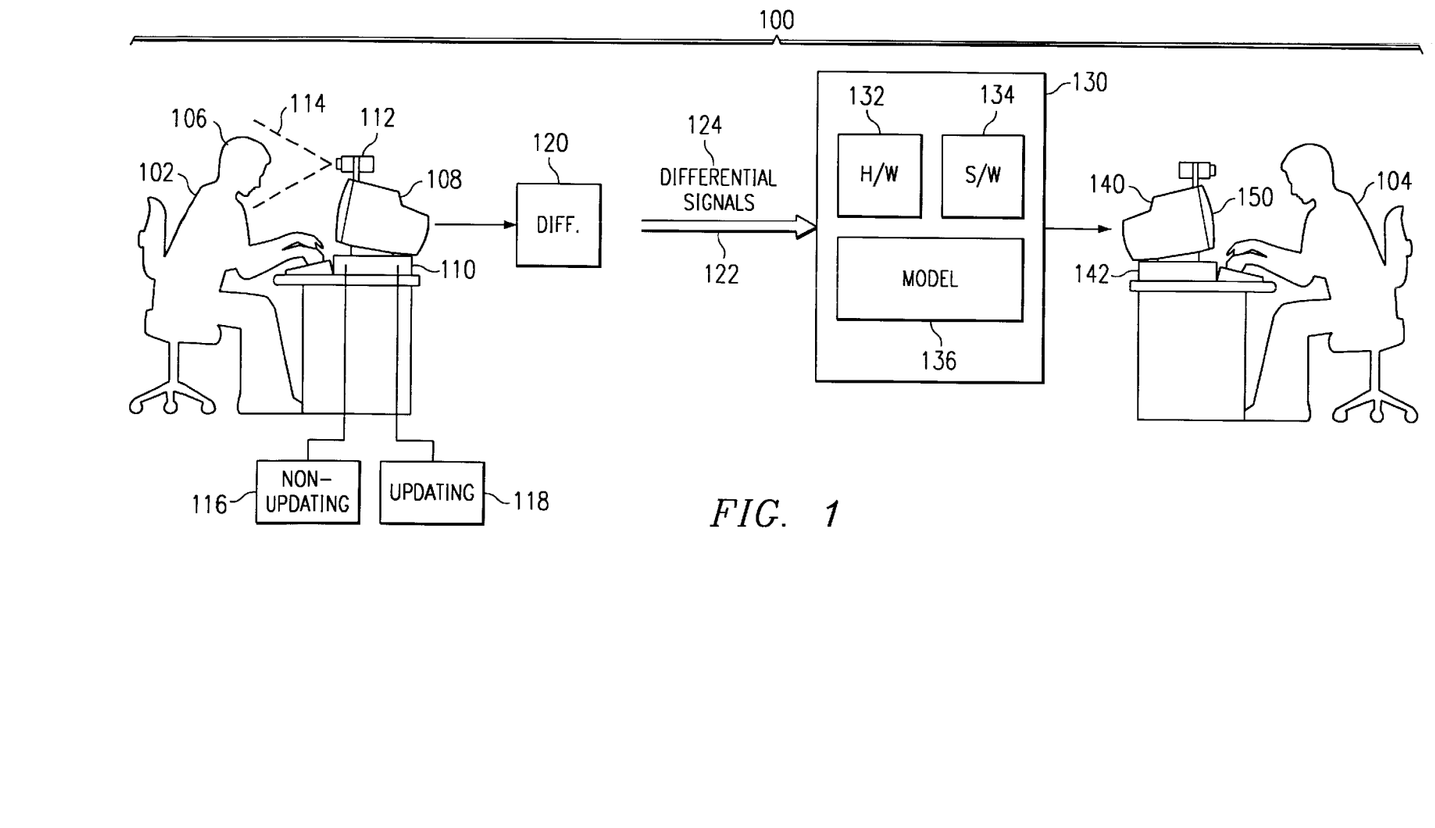
FIG. 1 illustrates a communication system that extracts, transmits and displays graphical representations in accordance with the present invention.

FIG. 1 illustrates a communication system 100 that extracts, transmits and displays video data. Transmitting user 102 and receiving user 104 communicate via video conferencing through communication system 100. Using communications system 100, receiving user 104 may view a displayed image 150 of head 106 of transmitting user 102. Specifically, model 136 is animated with data extracted from head 106. Camera 112 captures image 114 of head 106. Image 114 is a two-dimensional representation of head 106. Monitor 108 is coupled to video input device 110. Further, video input device 110 is coupled to a non-updating tracker 116 and an updating tracker 118. Non-updating tracker 116 searches for target images of the facial features of head 106 in image 114. Updating target tracker 118 then follows the image patch portions as they move in image 114 and locates an image patch portion that correlates to the facial feature at the target image. Image differentiator 120 processes the data gathered by video input device 110 and trackers 116 and 118 about the image patch portions in image 114. Image differentiator 120 is coupled to video input device 110, either internally or externally.

Image differentiator 120 processes data about positional differences of image patch portions within image 114 into image differential signals 124 that are transmitted to display device 130. Differential signals 124 are transmitted across transmitting media 122. Specifically, image differential signals 124 represent the positional differences of extracted facial parameters of head 106. Transmitting media 122 has a low bandwidth, such as cell phones and communication systems, having a capability of about 200 million instructions per second ("MIPS"). Alternatively, transmitting media 122 may have high bandwidth capability.

Image differentiator 120 may be a digital signal processor embedded in camera 112, monitor 108 or video input device 110. Camera 112, monitor 108 and video input device 110 may be stand alone devices, or in the alternative, a high-end PC computer or workstation system.

Non-updating tracker 116 and updating tracker 118 provide information on the orientation and movement of head 106, and the facial features of head 106. This data is utilized by image differentiator 120 to process differential signals 124. Image differential signals 124 are received by display device 130 that is coupled to video receiving device 142.

Display device 130 may be embedded in video receiving device 142, or, in the alternative, may be a stand alone device coupled to video receiving device 142. Display device 130 includes hardware component 132 and software component 134 that manipulates stored data regarding model 136. Specifically, hardware component 132 and software component 132 texture map and animate model 136 with received parameters and image differential signals 124. Display device 130 then displays animated model 150 on monitor 140 to receiving user 104. Animated model 150 is a three-dimensional representation of head 106 using the facial parameters extracted by video input device 110 and any positional differences noted by trackers 116 and 118. In the case of a cell phone, the display monitor 140 is on the cell phone and all components are on the cell phone.

Figure 2:
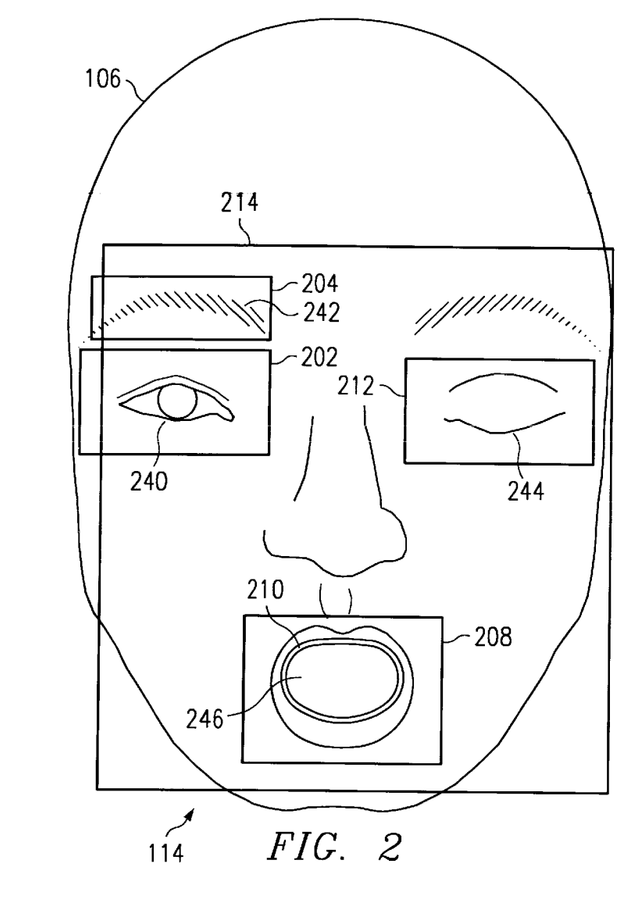
FIG. 2 illustrates an image of a head with facial features having image patch portions in accordance with the present invention.

FIG. 2 illustrates image 114 having image patch portions for facial features of head 106. Image 114 is comprised of pixels that represent different colors. The image patch portions of image 114 include eye portion 202 of eye 240, eyebrow portion 204 of eyebrow 242, mouth portion of 208 of mouth 246, and head portion 214 of head 106. Eye portion 212 represents eye 244, which is similar to eye portion 202 except eye 244 is closed, such as during a blink. Eye portions 202 and 212 are within head portion 214. Further, eyebrow portion 204 is within head 214. Moreover, mouth portion 208 is within head portion 214, and includes snake 210 that surrounds an inner circumference of the lips of mouth 246.

The image patch portions may be located by updating tracker 118 as head 106 moves in image 114. Initially, non-updating tracker 116 locates target images of the facial features of head 106 in order to position the image patch portions. For example, eye portion 202 is positioned where a target image of eye 240 is located by non-updating tracker 116. The eye target image may be stored in data on video input device 110. Alternatively, the eye target image of eye 240 may be a previous eye portion 202 captured by camera 112. For example, when positioning eye portion 202, non-updating tracker 116 searches for an excellent match for the eye target image within head portion 214. Further, non-updating tracker 116 may update image differentiator 120 with data on the location of eye portion 202 in image 114. The above-described operations are applicable with any image patch portion within image 114.

If non-updating tracker 116 is unable to locate an excellent match for the eye target image of eye 240, then updating tracker 118 searches for a best match of an updated eye target image of eye 240 within image 114. Updating tracker 118 searches for the updated eye target image within head portion 214. After the updated eye target image is located, updating tracker 118 updates the location for the next frame sequence.

Figure 3:
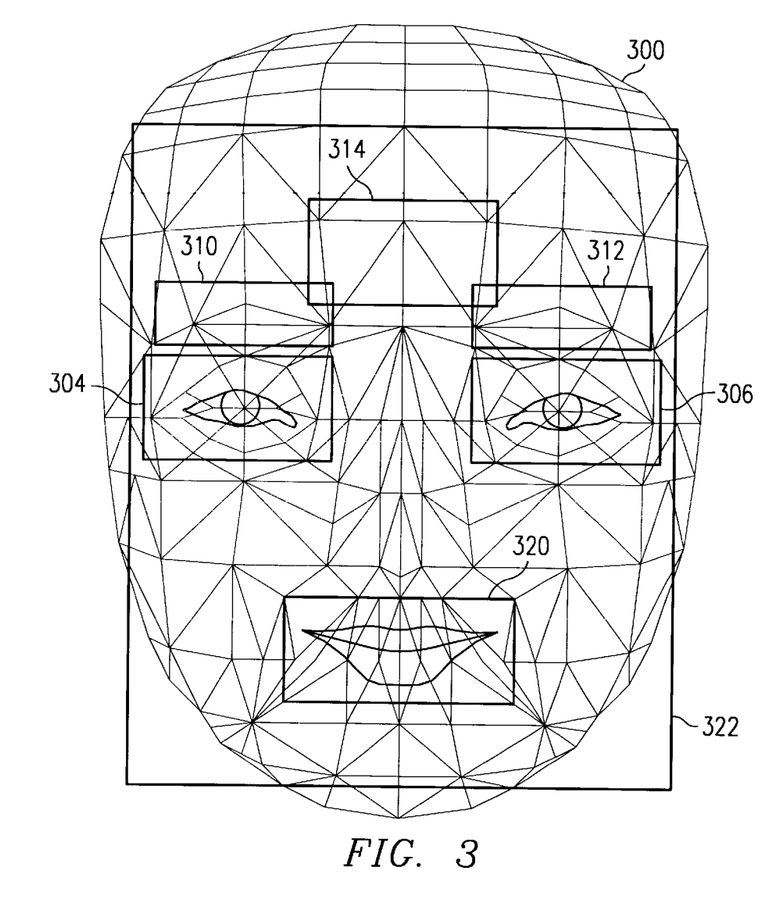
FIG. 3 illustrates a synthesized head created by a model in accordance with the present invention.

FIG. 3 illustrates a synthesized head 300 constructed from model 136 and received image differential signals 124. Synthesized head 300 includes a plurality of image patch representations that are texture mapped onto synthesized head 300 to resemble head 106 of transmitting user 102. The image patch representations includes eye portion representation 304, eyebrow portion representation 310, mouth portion representation 320, and head portion representation 322. Further, synthesized head 300 includes eye portion representation 306, which may be determined using heuristics based on information from eye portion representation 304. Similarly, eyebrow portion representation 312 may be determined using heuristics based on eyebrow portion representation 310. Forehead portion representation 314 also may be determined by information from eyebrow portion representation 310. Other heuristics may be used to keep the image patch portion representation within head portion representation 322, and to keep eye portion representation 306 left of eye portion representation 304. The same heuristics are used to locate eyebrow portion representations 310 and 312.

Figure 4:
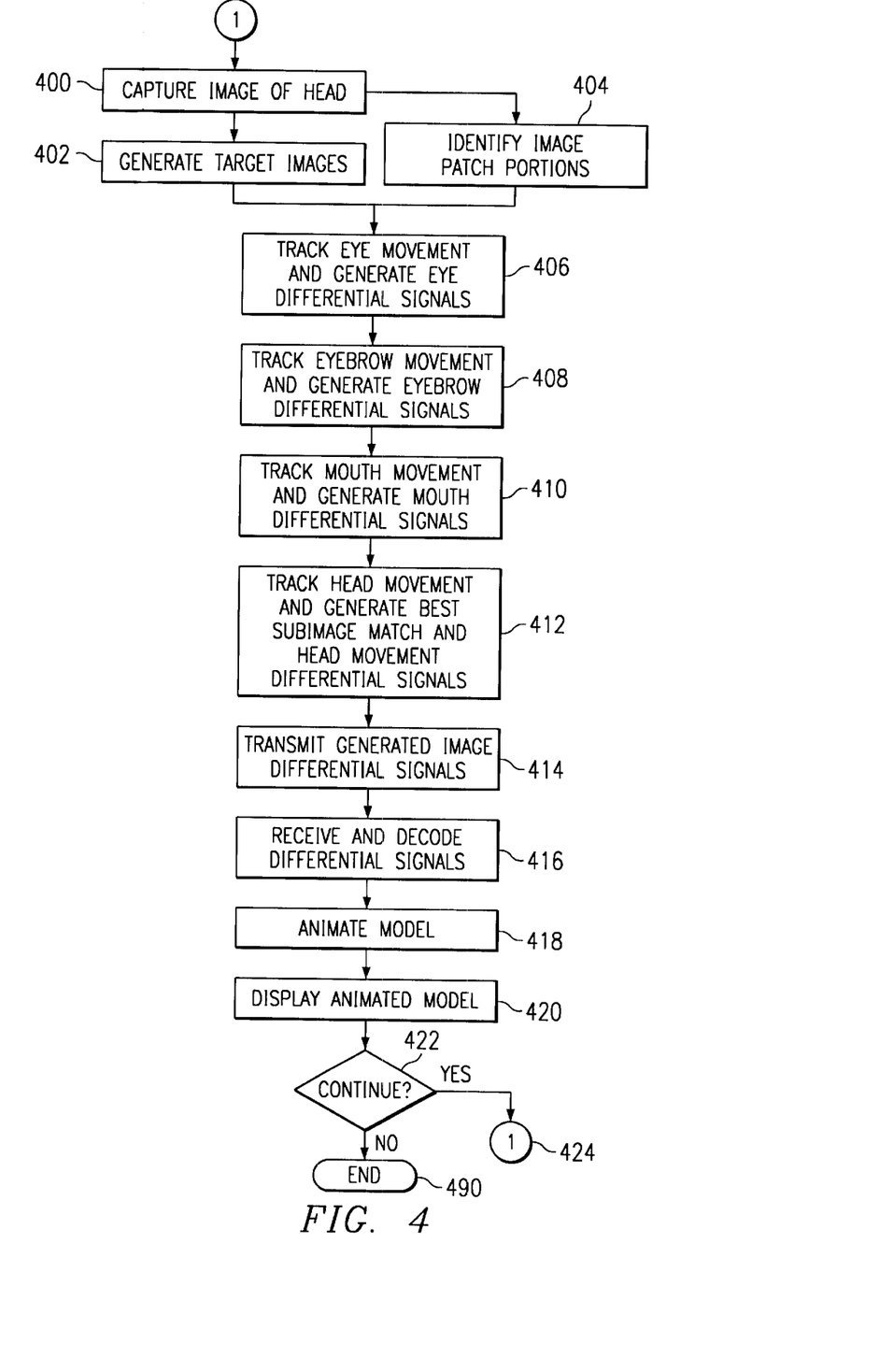
FIG. 4 illustrates a flow chart of a method for transmitting and displaying graphical representations in accordance with the present invention.

FIG. 4 illustrates a flow chart of a method for capturing, extracting and transmitting data in accordance with the present invention. In step 400, image 114 of head 106 is captured by camera 112. Camera 112 interacts with video input device 110 to capture image 114 of head 106 during this step. After step 400, step 402 and step 404 are executed. In step 402, target images of the facial features of head 106 are generated. These facial features include eye 240, eyebrow 242, mouth 246 and head orientation of head 106, as illustrated in FIG. 2. In step 404, video input device 110 identifies a plurality of image patch portions to be captured in image 114. These image patch portions correlate with the target images generated for the facial features of head 106.

The following steps 406–412 relate to specific operations that are executed to locate and track desired facial features of head 106. The present invention, however, is not limited to these facial features, and any feature on head 106 may be located and tracked by the present invention. In step 406, operations are executed to identify a position for eye portion 202 and to track the movement of eye portion 202 and to generate eye differential signals. In step 408, operations are executed to identify a position for eyebrow portion 204 and to track the movement of eyebrow portion 204 to generate eyebrow differential signals that are transmitted to display device 130. In step 410, operations are executed to identify a position for mouth portion 208 and to track movement of mouth portion 208, including lips, and to generate mouth differential signals. In step 412, operations are executed to identify a head portion 214 and update a target image of head 106, and to track head 106 movement and to generate head movement differential signals.

Step 414 transmits image differential signals 124 generated in steps 406–412, which relate to the movement of the image patch portions. In step 416, display device 130 receives image differential signals 124 transmitted in step 406–414. Image differential signals 124 are decoded using software component 134 and hardware component 132 of display device 130. In step 418, model 136 is constructed and animated by texture mapping the facial features on model 136 and with the image patch portion information derived from image differential signals 124 received in step 416. In step 420, animated model 150, created in step 418, is displayed by display device 130 on monitor 140. Step 422 queries whether communications system 100 wants to continue to update animated model 150 by advancing to the next frame of image 114. If communication system 100 desires to advance to the next frame of image 114, then step 424 is executed which returns communication system 100 back to step 400. If communication system 100 does not desire to continue further operations, then step 490 is executed and the parameter transmission is ceased.

Figure 5:
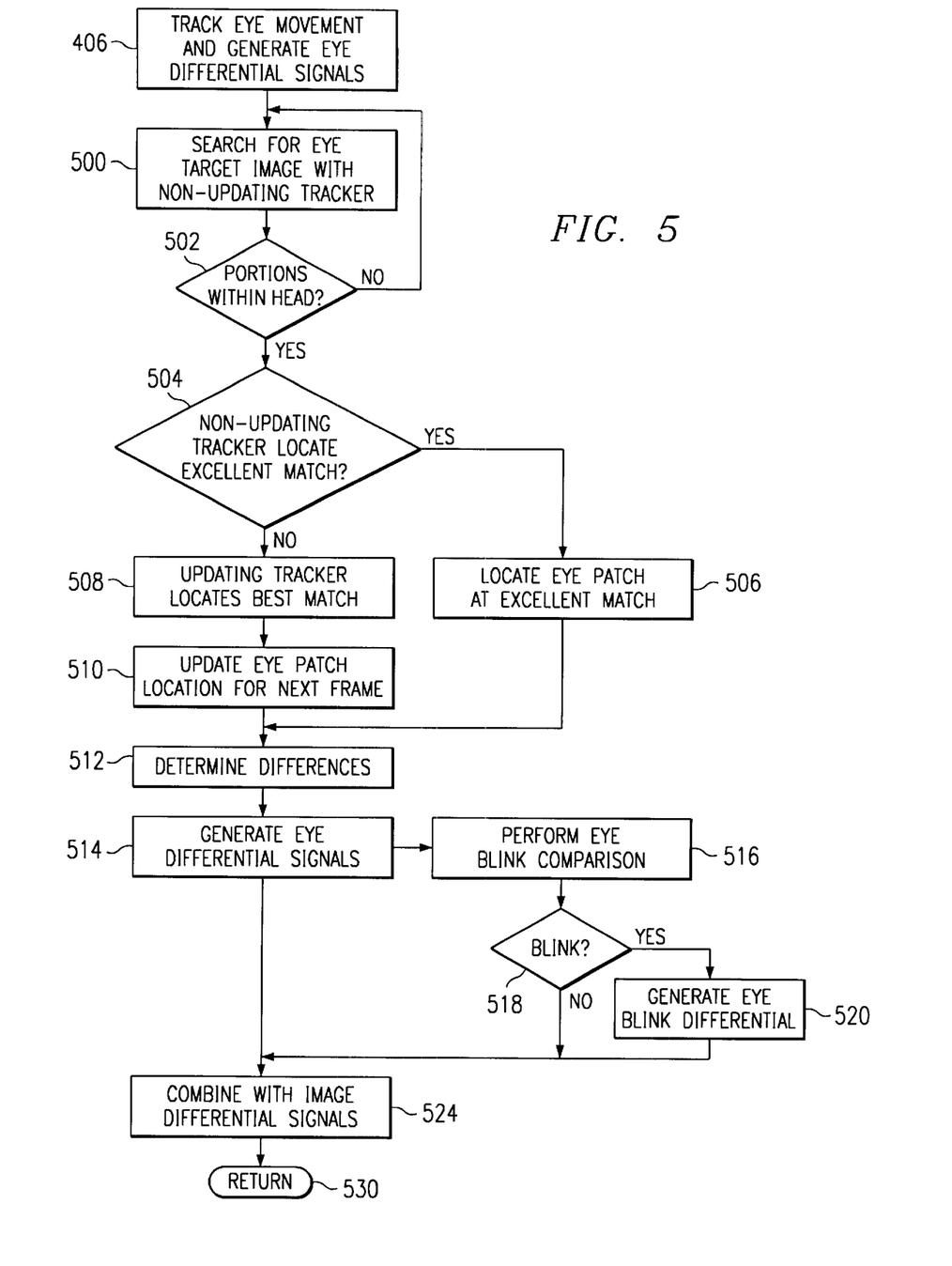
FIG. 5 illustrates a flow chart of an operation to track movement of eyes in a head in accordance with the present invention.

FIG. 5 illustrates a flow chart of an operation to track movement of eyes 240 and 244 using eye portions 202 and 212 in head portion 214 in accordance with the present invention. In step 406, communication system 100 indicates that eye differential signals are to be generated and transmitted to display device 130. In step 500, non-updating tracker 116 searches for an eye target image generated in step 402 of FIG. 4. As described above, the eye target image may be retrieved from data from video input device 110 or, in the alternative, a previous eye portion 202. The eye target image resembles eye 240 in head 106 as captured in image 114.

Non-updating tracker 116 may search for the eye target image at a location indicated in the previous frame of image 114. For example, non-updating tracker 116 or updating tracker 118 may indicate the location of the eye portion 202 from the previous frame of image 114. This location is where non-updating tracker 116 searches. Alternatively, non-updating tracker 116 may search in a fixed location within image 114 during each frame iteration, and not search in any other location within image 114. Further, non-updating tracker 116 also may search within a specified area for an excellent match to the eye target image. The size of the area may be varied, such as the upper facial region of head 106, or, alternatively, as large as head 106 itself. Thus, when non-updating tracker 116 does not locate an excellent match at the specified location, either fixed or updated as described above, then non-updating tracker 116 searches the specified area for an excellent match to the eye target image. Step 502 queries whether the image patch portion being searched is located within head portion 214. If the image patch portion is not located in head portion 214, then communication system 100 returns back to step 500.

If the eye target image is within head portion 214, then step 504 is executed. Step 504 queries whether the search for an excellent match of the eye target image with non-updating tracker 116 was successful. By locating an excellent match of eye 240 instead of a best match, communication system 100 adds robustness to the resulting image differential signals 124. If an excellent match is located in step 504, then step 506 is executed. Eye portion 202 then is positioned where the excellent target image match is located.

If an excellent match is not located in step 504, then step 508 is executed by having updating tracker 118 search for a best match of an updated eye target image of eye 240. A best match is not at the same level of robustness as an excellent match. The updated eye target image may be the eye target image used by non-updating tracker 116. Alternatively, the updated eye target image may be a previous eye portion 202, located by updating tracker 118. Updating tracker 118 searches for the best match within image 114. Once the best match is located, updating tracker 118 positions eye portion 202 at that location and notes the positional difference of eye portion 202 from the eye portion 202 in the previous frame of image 114. In step 510, updating tracker 118 updates the location of eye portion 202 for the next frame of image 114. Thus, when the next frame is executed, non-updating tracker 116 may search for an excellent match of the eye target image of eye 240 at this updated location, as described in step 500. Alternatively, non-updating tracker 116 may ignore this updated location.

Updating tracker 118 also updates eye portion 202 for a search in the next frame of image 114. If an excellent match is not located by non-updating tracker 116 in the next frame, updating tracker 118 searches for a best match for updated eye portion 202. In other words, updating tracker 118 searches for an image patch portion that matches the best match, or eye portion 202, of the previous frame. Thus, updating tracker 118 tracks the best match as it moves in image 114. When non-updating tracker 116 locates an excellent match for the eye target patch in subsequent frame, the updated best match, or eye portion 202, is overridden. In step 512, the positional differences of eye portion 202 detected by non-updating tracker 226 or updating tracker 118 are used to determine the movement of eye portion 202. In step 514, eye differential signals are generated relating to the positional differences determined in step 512. These differences include movement of eye portion 202 detected by updating tracker 118.

For example, user 102 may squint eye 240, which activates updating tracker 118 in accordance with steps 500–514 of FIG. 5. In accordance with step 500, non-updating tracker 116 searches for an eye target image of eye 240. As discussed above, non-updating tracker 116 may search at a fixed point, a specified area, or, alternatively, an updated location determined by updating tracker 118 in a previous frame. Because eye 240 is squinting, non-updating tracker 116 is unable to locate an excellent match in step 504. Thus, updating tracker 118 is activated in step 508, and updating tracker 118 searches for a best match of an updated eye target image. The updated eye target image may be the eye target image used by non-updating tracker 116, or, alternatively, a previous eye portion 202.

Updating tracker 118 searches for the best match within the image patch portions of image 114 for the updated eye target image. In this example, the best match is squinting eye 240. Updating tracker 118 locates eye portion 202 at squinting eye 240, and generates a signal that indicates any positional differences of eye portion 202. Updating tracker 118 also updates the updated eye target image with eye portion 202, which depicts eye 240 squinting.

In accordance with step 512, differences are determined between eye portion 202 and the location of eye portion 202 in the previous frame of image 114. The differences are used in accordance with step 514 to generate eye differential signals to be transmitted in accordance with step 414 of FIG. 4.

When step 500 is executed in the next frame of image 114, non-updating tracker 116 again searches for an excellent match to the eye target image of eye 240. If an excellent match is located, then eye 240 is not squinting, and updating tracker 118 is not activated. However, if an excellent match is not located, then updating tracker 118 searches for the best match to the updated eye target image, which was squinting eye 240 from eye portion 202 of the previous frame. If eye 240 is still squinting, updating tracker 118 notes this in its update for the subsequent frame.

In another example, eye 240's movement with head 106 is tracked in accordance with the present invention. Because eye 240 has moved, an excellent match is not located, and updating tracker 118 searches for a best match to the updated eye target image. Updated eye target image resembles the eye target image used by non-updating tracker 116. Updating tracker 118 locates the best match at eye 240's new location and positions eye portion 202 of the new location. Updating tracker 118 then sends a signal indicating the new location of eye portion 202, and updates the updated eye target image with eye portion 202. If updating tracker 118 is activated in a subsequent frame, then updating tracker 118 begins its search at the location noted by updating tracker 118 in the previous frame and searching for a best match to eye portion 202.

In step 516, an eye blink comparison that compares eye portion 202 to the eye target image is performed. Eye blinks provide additional realism in animating models for video telecommunications. The human eye blinks periodically to remain moist. By providing eye blinks, the believability of a computer generated face is enhanced. According to the present invention, eye blinks may be detected and transmitted with image differential signals 124 to animate synthesized head 300 in order to create animated model 150. Because eyes blink simultaneously and very quickly, the blinking motion may be detected using differences between eye portion images in successive frames.

Referring back to FIG. 2, eye 244 correlates with eye portion 212. As indicated, eye 244 is closed, such as during a blink. As eye 244 is being tracked using eye portion 212, the captured frames may be compared to the eye target image to determine when a blink occurs. Referring to eye portion 212 and eye 244, a difference is detected in successive eye portions 212 by comparing the two eye portions 212 with each other.

The comparison is performed by subtracting eye portion 212 from a previous eye portion 212. If the difference is too high between the successive eye portions 212, then a blink may have occurred. The difference is too high if above a predetermined threshold, which may be user defined or system defined. For example, if the number of pixels that have changed from one eye portion 212 to a successive eye portion 212 is above 80 percent of total number of pixels in the eye portions 212, then the threshold has been surpassed.

Updating tracker 118 then looks for "blobs" in eye portion 212. Updating tracker 118 locates blobs by comparing the pixels in eye portion 212. The pixels may be "on" or "off" a certain desired color, such a skin tone. Updating tracker 118 determines how many pixels have an on and off status, and looks to see if the pixels touching pixels of similar status. If a large group of pixels touch pixels having similar status, then a "blob" has been located, and a blink has occurred. Updating tracker 118 only may require one blob for a blink. Alternatively, updating tracker 118 may require two blobs, one each in eye portions 202 and 212 to indicate a blink. Because updating tracker 118 updates itself on location and content of eye portions 201 and 212, blinks are determined and indicated even as eyes 240 and 244 move with head 106.

Further, heuristics, such as aspect ratio, distance between blobs, and axis alignment may be used to filter candidate blinks. Thus, step 518 queries whether a blink has occurred, according to the operations executed in step 516. If a blink has occurred in step 518, step 520 is executed that generates an eye blink differential signal. A differential image is then processed with a connected components algorithm. If the differential image indicates that the threshold for a blink has been surpassed and blobs detected, then this information is transferred with the eye differential signals. Because eyes generally blink simultaneously, the eye differential signals may indicate a blink for eyes 240 and 244. Further, criteria may be added that a blink only may occur in eye 244. In other words, a blink may not occur in eyebrow portion 204. This operation allows the present invention to detect blinks even as head 106 moves in image 114. Moreover, eye blink information may be used as feedback to updating tracker 118 and non-updating tracker 116.

In step 524, the eye differential signals and eye blink differential signals are processed by image differentiator 120 and combined with image differential signals 124. These eye differential signals includes differential signals generated in steps 510 and 516. Step 530 then is executed, which returns communication systems 100 back to the appropriate step in FIG. 4 and to await another eye tracking operation for the next frame of image 114.

Figure 6:
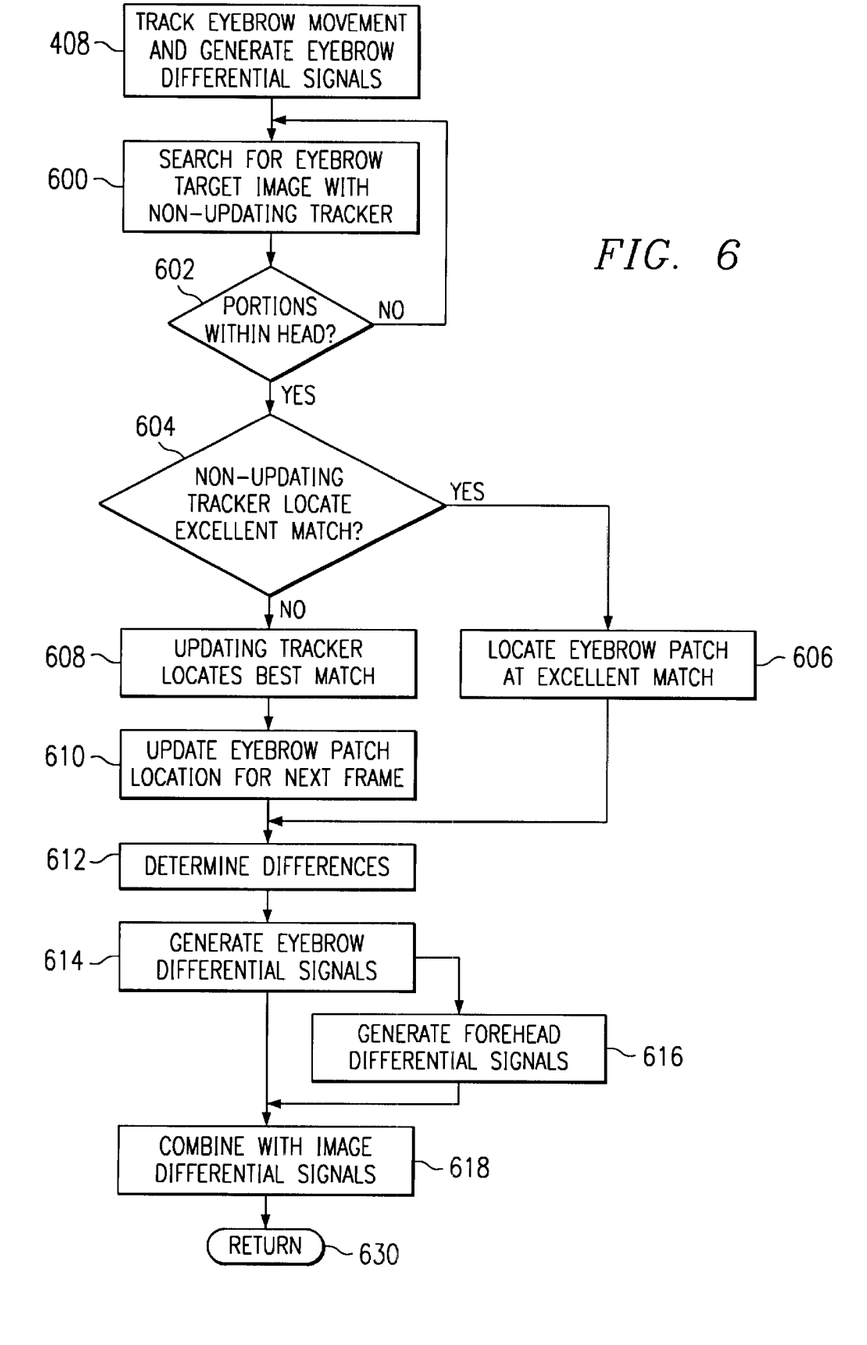
FIG. 6 illustrates a flow chart of an operation to track movement of eyebrows in a head in accordance with the present invention.

FIG. 6 illustrates a flow chart of an operation to track movement of eyebrow 242 by eyebrow portion 204 in image 114. In step 408, communication system 100 indicates that differential signals are to be generated regarding eyebrow 242 in head 106. In step 600, non-updating tracker 116 searches for an eyebrow target image generated in step 402 of FIG. 4. Non-updating tracker 116 searches for the eyebrow target image in a similar manner to the eye target image search described in FIG. 5. As non-updating tracker 116 searches for the eyebrow target image of eyebrow 242, the target images are determined to be within head portion 214 in step 602. If the eyebrow target image is not within head portion 214, then communication system 100 returns to step 600. If the eyebrow target images are within head portion 214, then step 604 is executed.

In step 604, non-updating tracker 116 searches for an excellent match to the eyebrow target image. If non-updating tracker 116 locates an excellent match in step 604, then step 606 is executed by positioning eyebrow portion 204 where the excellent target image match is located. If an excellent match is not located in step 604, then step 608 is executed by having updating tracker 118 search for a best match of an updated eyebrow target image of eyebrow 242. The updated eyebrow target image may be the eyebrow target image used by non-updating tracker 116. Alternatively, the updated eyebrow target image may be a previous eyebrow portion 204 located by updating tracker 118. In step 610, updating tracker updates eyebrow portion 204 for the search in the next frame of image 114. Thus, eyebrow portion 204 may be used as an updated eyebrow target image in a subsequent search.

Updating tracker 118 also detects the positional differences in position of eyebrow portion 204 in step 610. In step 612, the positional differences detected by non-updating tracker 116 or updating tracking 118 in positioning eyebrow portion 204 are used to determine the movement of eyebrow portion 204. In step 614, eyebrow differential signals are generated to transmit the differences determined in step 612. In step 616, forehead differential signals may be generated with the positional data used to generate the eyebrow differential signals. Because forehead wrinkles are made by eyebrow movement, wrinkles on a forehead may be inferred by the movement of eyebrow portion 204. In step 618, the eyebrow differential signals and the forehead differential signals are combined with image differential signals 124 to be transmitted across transmitting media 122 to display device 130. Step 630 is executed to return communication system 100 back to the appropriate step in FIG. 4 and to await another eyebrow tracking operation for the next frame of image 114.

Figure 7:
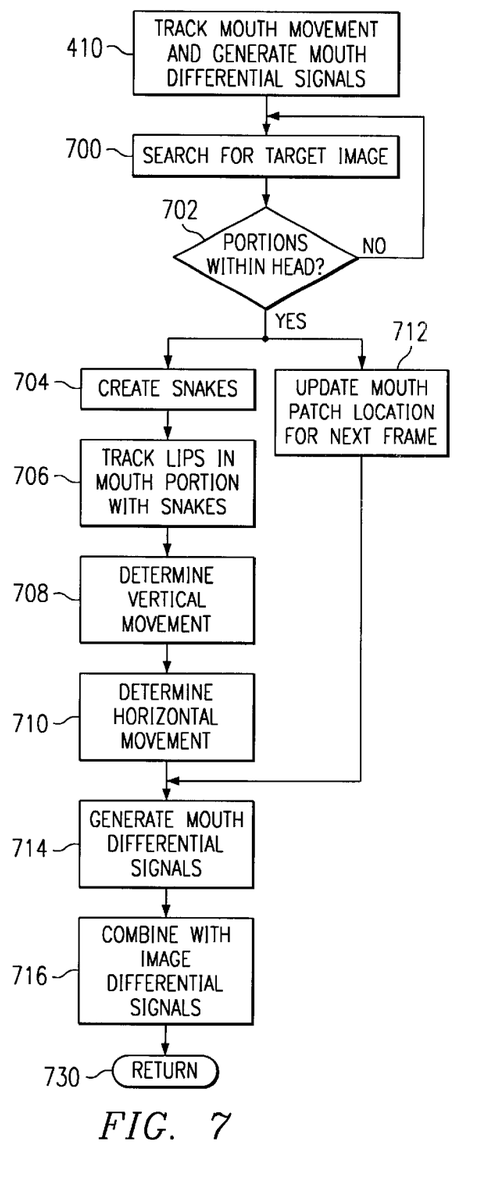
FIG. 7 illustrates a flow chart of an operation to track movement of a mouth in a head in accordance with the present invention.

FIG. 7 illustrates a flow chart of an operation to track movement of mouth 246 using mouth portion 208 and generate mouth differential signals to be transmitted to display device 130. In step 700, non-updating tracker 116 searches for a target image of mouth 246 within image 114. This target image may be a previous mouth portion located by trackers 116 or 118. In step 702, queries are made as to whether the mouth target images representing mouth 246 are within head portion 214. If the queried mouth portions 208 are not within head portion 214, then communication system 100 is returned to step 700. If queried mouth portions 208 are within head portion 214, then mouth portion 208 is tracked by updating tracker 118.

In step 704, snakes 210 are created to accurately and quickly track the contour of the inside of the lips in mouth 246. Snakes 210 may be created by video input device 110. By tracking the lips with snakes 210, the motion of a jaw and cheeks in head 106 may be calculated and included with image differential signals 124 transmitted to display device 130. Lips are important in generating an accurate representation of head 106 because lips convey emotion and the meaning of words spoken by transmitting user 102. Step 706 tracks the lips in mouth portion 208 with the snakes 210. In step 708, vertical movements of the snakes 210 determine vertical movement of the lips of mouth 246. In step 710, horizontal movement of snakes 210 are tracked as well. The horizontal movement of snakes 210 may be tracked by the updating tracker 118 continuously, or only activated if the inner frame distance of mouth portion 208 is less than a few pixels. This discrimination of the horizontal movement of snakes 210 reduces the bandwidth requirements for image differential signals 124.

In step 712, the mouth differential signals are generated using the positional differences of mouth portion 208 and snakes 210 detected by updating tracker 118. In step 714, the mouth differential signals are combined with image differential signals 124 and transmitted to display device 130. In step 730, communication system 100 is returned back to the appropriate step in FIG. 4.

Figure 8:
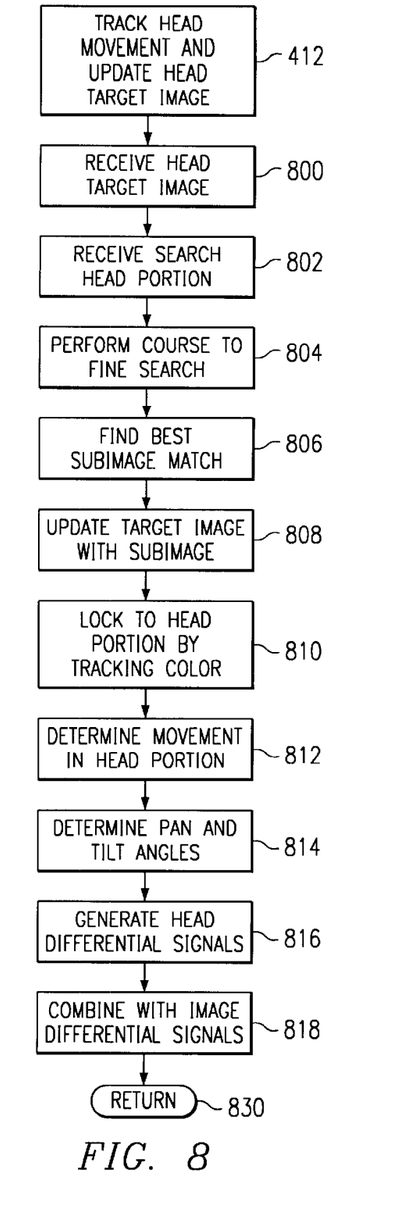
FIG. 8 illustrates a flow chart of an operation to track movement of a head in accordance with the present invention.

FIG. 8 illustrates a flow chart of an operation to track movement of head 106 and to update a head target image in accordance with the present invention. In step 412 of FIG. 4, communication system 100 indicates that a head target image is to be updated and head differential signals are to be generated and transmitted to display device 130. In step 800, a head target image is received from communication system 100. The head target image is a target image of head 106 in image 114. In step 802, a search head image, or head portion 214, is received from incoming video from video input device 110. Head portion 214 may be an updated image of head 106 of user 102. In step 804, a coarse to fine search of the sum of absolute differences of the head target image is performed. Further, a coarse to fine search of the sum of absolute differences of head portion 214 is performed as well. This search is performed as a pyramid reduction, searching the coarsest levels of the head target image and head portion 214 first for a best match. The coarse to fine search is then applied to the next level using the information from the previous level. The search is repeated until the finest, or original, level is reached. In step 806, the best subimage match is found between the head target image and head portion 214. Further, the location of the best subimage match of head portion 214 in image 114 is determined. In step 808, location of the best subimage match is received and the head target image is updated with that subimage found in step 806.

Communication system 100 also tracks head 106 via head portion 214, as head 106 moves in image 114. In step 810, updating tracker 118 located head portion 214 in image 114. In an embodiment, updating tracker 118 may locate head portion 214 as described above. In an alternative embodiment, updating tracker 118 may lock to color space information provided for head portion 214. Specifically, updating tracker 118 searches for a particular color, such as skin tone, and locates a blob, as described in FIG. 5 above, containing skin tone color as the blob moves in image 114. By tracking using color space information, updating tracker 118 reduces drift due to error accumulation or extremely fast motion. An initial color model may be built of the skin colors using distribution in UV space, and this information may be used as feed back by updating tracker 118. The increased robustness of updating tracker 118 from the color space information allows reliable tracking of head 106 for extended periods of time.

In step 812, movement of head portion 214 is determined from positional differences between head portions 214 noted by updating tracker 118. Again, updating tracker 118 may follow a blob containing color space information in head 106. Updating tracker 118 determines how far head 106 has moved in image 114 in the vertical and horizontal directions. In step 814, the pan and tilt angles of head 106 may be determined by using the distances moved in the horizontal and vertical directions detected by updating tracker 118. Thus, step 816 is executed by generating head differential signals that represent the distance and angle of the positional differences of head 106. In step 818, the head differential signals are combined with image differential signals 124 to be transmitted to display device 130. Step 830 is executed by returning control of communication system 100 back to the appropriate step in FIG. 4.

Thus, it is apparent that there has been provided, in accordance with the present invention, an apparatus and method for transmitting a graphical representation that satisfies the advantages set forth above. Although the present invention has been described in detail, it should be understood that various changes, substitutions, and alterations may be made herein. Other examples are readily ascertainable by one skilled in the art and can be made without departing from the spirit and the scope of the present invention as defined by the following claims.

What is claimed is:

1. An apparatus for transmitting and displaying graphical representations, comprising:

an image generator generating an image of a head including an eye portion correlating to an eye in said head;

a non-updating tracker coupled to said image generator, that searches for an eye target image of said eye in said image, wherein said eye portion is positioned at said eye target image and the location of said eye portion is determined;

an updating tracker coupled to said image generator, that searches for an updated eye target image when said non-updated tracker is unable to locate said eye target image, wherein said eye portion is positioned at said updated eye target image and said updated eye target image is updated by said eye portion, and the location of said eye portion is determined;

an image differentiator coupled to said trackers for providing image differential signals, including eye differential signals representing positional differences determined from the location of said eye portion; and a display device that receives said image differential signals, including eye differential signals, and animates a model with said image differential signals.

2. The apparatus of claim 1, wherein said image generator generates an eyebrow portion, such that said non-updating tracker searches for an eyebrow target image of an eyebrow such that said eyebrow portion is positioned at said eyebrow target image and the location of said eyebrow portion is determined, and said updating tracker searches for an updated eyebrow target image when said non-updating tracker is unable to locate said eyebrow target image, wherein said eyebrow portion is positioned at said updated eyebrow target image and said updated eyebrow target image is updated by said eyebrow portion, and the location of said eyebrow portion is determined, such that said image differentiator further provides eyebrow differential signals representing positional differences determined from the location of said eyebrow portion, wherein said eyebrow differential signals animate said model.

3. The apparatus of claim 2, wherein said image differentiator further provides forehead differential signals derived from said eyebrow differential signals.

4. The apparatus of claim 1, wherein said image generator is a camera that captures said image.

5. The apparatus of claim 1, further comprising a transmitting media having a low bandwidth.

6. The apparatus of claim 1, wherein said image generator generates a mouth portion correlating to a mouth in said head, said mouth portion having snakes correlating to lips in said mouth, wherein said updating tracker locates and positions said mouth portion and said snakes such that said image differentiator further provides mouth differential signals representing positional differences determined from the location of said mouth portion and said snakes such that said mouth differential signals animate said model.

7. The apparatus of claim 1, wherein said image generator generates a head portion correlating to said head, wherein said updating tracker locates and positions said head portion at a head target image, such that head differential signals are provided by said image differentiator representing positional differences determined from the location of said head portion to be transmitted with said image differential signals, and said head target image is updated with a subimage of said head portion.

8. The apparatus of claim 7, wherein another eye portion is generated using heuristics, such that said another eye portion is located opposite said eye portion, and said another eye portion and said eye portion are located in said head portion.

9. The apparatus of claim 1, wherein said model is a three-dimensional representation.

10. The apparatus of claim 1, wherein said image is a two-dimensional representation.

11. The apparatus of claim 1, wherein said image differentiator includes a signal processing device.

12. The apparatus of claim 1, where said display device includes a hardware device and a software device.

13. The apparatus of claim 1, wherein said eye differential signals include eye blinks when a blob is determined to be in said eye portion.

14. A method for transmitting and displaying graphical information, the method comprising the steps of:
   capturing an image of a head with an eye, said image having an eye portion correlating to said eye;
   locating an eye target image of said eye within said image with a non-updating tracker, and positioning said eye portion at said eye target image and determining the location of said eye portion;
   locating an updated eye target image with an updating tracker when said non-updating tracker is unable to locate said eye target image, positioning said eye portion at said updated eye target image, updating said updated eye target image with said eye portion, and determining the location of said eye portion;
   generating eye differential signals with an image differentiator representing positional differences determined from the location of said eye portion within said image; and
   displaying an animated model of said image with said eye differential signals.

15. The method of claim 14, further comprising the steps of:
   transmitting said differential signals across a transmitting media.

16. The method of claim 14, further comprising the steps of:
   locating a head target image within said image with said updating tracker;
   positioning a head portion at said head target image;
   updating a head target image with a subimage match of said head portion;
   generating head differential signals representing positional differences determined from the location of said head portion within said image of said head portion; and
   animating said model with said head differential signals.

17. The method of claim 14, further comprising the steps of:
   locating a mouth target image within said image with said updating tracker;
   positioning a mouth portion at said mouth target image;
   creating and tracking snakes within said mouth portion that correlate to lips in said head, with said updating tracker;
   generating mouth differential signals for positional differences of said mouth portion and said snakes within said image; and
   animating model with mouth differential signals.

18. The method of claim 14, further comprising the steps of:
   capturing an eyebrow portion within said image;
   locating an eyebrow target image of an eyebrow in said head with said non-updating tracker and positioning said eyebrow portion at said eyebrow target image and determining the location of said eyebrow portion;
   locating an updated eyebrow target image with said updating tracker when said non-updating tracker is unable to locate said eyebrow target image, positioning said eyebrow portion at said updated eyebrow target image, updating said updated eyebrow target image with said eyebrow portion, and determining the location of said eyebrow portion;
   generating eyebrow differential signals with said image differentiator representing positional differences determined from the location of said eyebrow portion within said image; and
   animating said model with said eyebrow differential signals.

19. An apparatus for transmitting and displaying graphical representations, comprising:
   a camera for generating a two-dimensional image of a head having an eye portion correlating to an eye in said head, an eyebrow portion correlating to an eyebrow in said head, a mouth portion correlating to a mouth in said head, and a head portion correlating to said head;

a non-updating tracker coupled to said camera that searches for an eye target image of said eye and an eyebrow target image of said eyebrow within said image, wherein said eye portion is positioned at said eye target image and said eyebrow portion is positioned at said eyebrow target image and the locations of said eye portion and said eyebrow portion are determined;

an updating tracker coupled to said camera that searches for an updated eye target image when said non-updating tracker is unable to locate said eye target image and searches for an updated eyebrow target image when said non-updating tracker is unable to locate said eyebrow target image, and searches for a head target image and a mouth target image, wherein said updating tracker positions said eye portion at said updated eye target image, said eyebrow portion at said updated eyebrow target image, said mouth portion at said mouth target image, and said head portion at said head target image and the locations of said portions are determined;

an image differentiator coupled to said trackers for providing image differential signals representing positional differences determined from the locations of said portions, including eye differential signals, eyebrow differential signals, mouth differential signals, and head differential signals;

a low bandwidth transmission media that transmits said image differential signals; and a display device that receives said image differential signals and animates a three-dimensional model with said differential signals.

* * * * *